(12) United States Patent
Lutz

(10) Patent No.: US 12,298,745 B2
(45) Date of Patent: May 13, 2025

(54) EVENT RELATED LOAD RESTRICTIONS OF A SERVER OF A CONTROL SYSTEM OF A TECHNICAL PLANT

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

( * ) Notice: Subject to any disclaimer, the term of this patent is extended or adjusted under 35 U.S.C. 154(b) by 332 days.

(21) Appl. No.: 17/583,363

(22) Filed: Jan. 25, 2022

(65) Prior Publication Data

US 2022/0236719 A1 Jul. 28, 2022

(30) Foreign Application Priority Data

Jan. 26, 2021 (EP) .................................. 21153550

(51) Int. Cl.
  *G05B 19/418* (2006.01)
(52) U.S. Cl.
  CPC ... *G05B 19/4185* (2013.01); *G05B 19/41845* (2013.01); *G05B 19/41875* (2013.01); *G05B 19/4188* (2013.01)
(58) Field of Classification Search
  CPC .......... G05B 19/4185; G05B 19/41845; G05B 19/41875; G05B 19/4188; G05B 9/02; G05B 2219/36391; G05B 2219/36536; G05B 19/409; G05B 2219/31088
  See application file for complete search history.

(56) References Cited

U.S. PATENT DOCUMENTS

| | | | |
|---|---|---|---|
| 2004/0122532 A1* | 6/2004 | Albert | G05B 15/02 700/2 |
| 2005/0262498 A1* | 11/2005 | Ferguson | G06F 8/65 717/172 |
| 2009/0077055 A1 | 3/2009 | Dillon et al. | |
| 2015/0007155 A1* | 1/2015 | Hoffman | G06F 8/65 717/168 |
| 2017/0017228 A1 | 1/2017 | Kato et al. | |
| 2018/0107473 A1* | 4/2018 | Ahmed | G06F 8/654 |
| 2019/0034194 A1* | 1/2019 | Fox | G06F 8/71 |
| 2020/0026254 A1* | 1/2020 | Barthel | G05B 19/052 |

FOREIGN PATENT DOCUMENTS

| | | |
|---|---|---|
| EP | 2038714 | 3/2009 |
| EP | 3623891 | 3/2020 |

OTHER PUBLICATIONS

EP Search Report dated Jul. 15, 2021 based on EP21153550 filed Jan. 26, 2021.

* cited by examiner

*Primary Examiner* — Christopher E. Everett
(74) *Attorney, Agent, or Firm* — Cozen O'Connor

(57) ABSTRACT

A control system for a technical plant, in particular a process or production plant, includes an operator station server and an engineering station server, wherein the engineering station server includes a computer-implemented design tool via which an automation configuration for an automation of the technical plant can be created, and wherein the engineering station server transmits the automation configuration for operating and monitoring the technical plant to the operator station server, where operator station server of the control system refuses, for a specific period of time, receipt or processing of the automation configuration for the operation and monitoring of the technical plant if an abort condition is present.

12 Claims, 3 Drawing Sheets

EVENT RELATED LOAD RESTRICTIONS OF A SERVER OF A CONTROL SYSTEM OF A TECHNICAL PLANT

BACKGROUND OF THE INVENTION

1. Field of the Invention

The invention relates to method for operating a technical plant with a control system and to a control system for the technical plant, in particular a process or production plant, which includes an operator station server and an engineering station server, where the engineering station server comprises a computer-implemented design tool via which an automation configuration for an automation of the technical plant is able to be created, and where the engineering station server is configured to transmit the automation configuration to the operator station server for operation and monitoring of the technical plant.

2. Description of the Related Art

A control system of a technical plant comprises many components that must be planned into a project, loaded and updated during the life cycle of the plant. When changes are made to project planning, the components of a control system (e.g., automation units, and/or operator station server) are loaded from the engineering station server into the operator station server for example. EP 3 623 891 A1 discloses an exemplary control system.

A control system in the present context is to be understood as a computer-assisted technical system, which comprises functionalities for displaying, operating and controlling a technical system such as a production plant. The control system, as well as the operator station server and the operator station client, for example, can also comprise what are known as process-related or production-related components that serve to activate actuators or sensors.

The technical plant can involve a plant from the process industry, such as a chemical, pharmaceutical or petrochemical plant or a plant from the food and drink and tobacco industry. Also encompassed by this is any plant from the production industry, works in which, for example, cars or all kinds of goods are produced. Technical plants, which are suitable for implementing the inventive method, can also come from the area of energy generation. Wind turbines, solar plants or power stations for energy generation are likewise covered by the term technical plant.

If operators and project planners of the control system or of the technical plant are not "synchronized", because they are at different locations, for example, or cannot reach each other for other reasons, it can occur that, through the non-synchronized loading of automation data at the operator station server, the operator in the middle or error handling or a critical optimization loses control of the operation and monitoring of the technical plant, and the plant can suffer damage thereby. Moreover, it is possible that the operator station server itself is currently in a situation in which a loading can lead to problems (for example, with a threat of overloading or exceeding the processing capacity of the operator station server).

An "operator station server" in the present case is understood to mean a server that acquires data of an operating and monitoring system and also as a rule alarm and measured value archives of a control system of technical plant centrally and makes it available to users. As a rule, the operator station server establishes a communication link to automation systems (e.g., an automation device) of the technical plant and passes on data of the technical plant, which is used to for operation and monitoring of an operation of the individual functional elements of the technical plant to what are known as "operator station clients".

The operator station server itself can have client functions available to it in order to access the data (archive, messages, tags, variables) of other operator station servers. This enables images of operation of the technical plant to be combined at the operator station server with variables of other operator station servers (server-server communication). The operator station server can, without being restricted thereto, involve a SIMATIC PCS 7 Industrial Workstation Server made by SIEMENS.

SUMMARY OF THE INVENTION

It is an object of the invention is to provide a control system for a technical plant that makes it possible to operate and modify the technical plant with a high availability.

This and other objects and advantages are in accordance with the invention by a control system for a technical plant, in particular a production or process plant, and by a method for operating the technical plant with the control system in which an operator station server of the control system is configured to refuse to receive or process an automation configuration for the operation and monitoring of the technical plant, for a specific period of time, if an abort condition is present.

The automation configuration, which can be created by the computer-implemented design tool at the engineering station server, serves to operate and monitor the technical plant. The automation configuration can, for example, comprise plant mimic diagrams, which the operator station server can transmit after receiving them to a separate operator station client for visual presentation to an operator of the technical plant. In such cases, the plant mimic diagrams usually involve operating images used for control systems, which comprise graphical representations of individual elements of the technical plant and serve to show a status of the individual elements, of a (process-engineering) relationship between the elements or the like.

The plant mimic diagrams, in such cases, can comprise an alarm message display. This can, for example, deliver, in a tabular listing, an overview of the alarm messages arising in the control system. The overview is also referred to as a message sequence display.

In accordance with the invention, the operator station server is configured, when an abort condition is present, to interrupt the receipt of the new or updated automation configuration from the engineering station server or the processing of the automation configuration for a specific period of time. This enables the threat of an overload of the operator station server and/or an interruption of the operation and monitoring of the technical plant to be prevented. This advantageously enables the availability of the operation and monitoring of the technical plant to be increased.

Preferably, the operator station server is configured to inform the engineering station server about the refusal of the receipt or the processing of the automation configuration. The operator station server can, for example, notify the engineering station server that it cannot receive or process any automation configuration for the specific period of 10 minutes. The operator station serve can also notify engineering station server that a size of the automation configuration may not exceed a certain amount or the like.

Especially preferably, the operator station server is configured to inform an operator of the technical plant about the refusal of the receipt or the processing of the automation configuration. Here, the operator station server can also notify the operator, for example that, for a specific period of 10 minutes, he cannot receive or process any automation configuration or the like.

Within the framework of an advantageous embodiment of the control system the operator station server is configured to generate an alarm message that includes information about the refusal of the receipt or of the processing of the automation configuration by the operator station server. This alarm message can be provided in the alarm message display (message sequence display) of the control system of all participants affected by the interruption (project planners, operators etc.). The operator of the technical plant is preferably provided with the alarm message by an operator station client (visually), which the operator uses for operation and monitoring of the technical plant.

Preferably, the operator station server is configured to automatically establish the presence of the abort condition (i.e., without intervention by the operator or other persons). This preferably occurs via recognition of a possible overloading of the operator station server by the receipt of the automation configuration from the engineering station server or by the processing of the automation configuration. Here, the operator station server compares its present load or its present free resources with the extra load to be expected through the receipt (or processing) of the new or updated automation configuration, in order to create a forecast relating to a potential overload.

In particular, the operator station server is configured in this case to also automatically establish an end of the specific period of time. This preferably occurs via recognition of the removal of a possible overload of the operator station server through the receipt of the automation configuration from the engineering station server or through the processing of the automation configuration.

In an advantageous embodiment of the invention, the operator station server is configured to be notified of the presence of the abort condition by an operator of the technical plant during operation and monitoring of the technical plant. If, for example, the operator is merely undertaking optimizations, dealing with error handling or undertaking operating actions or the like, which may not be interrupted until they are completed, then the operator can manually define a loading restriction (temporary receipt refusal) or a processing restriction of the operator station server. After completion of his work, the operator can remove the restriction again.

An operator station client, which the operator can use for operation and monitoring of the technical plant, can be logged into different operator station servers, within the framework of an advantageous development of the operator station server. As a result, it is possible to derive which (additional) operator station servers must be affected by the restriction. If, for example, the operator with the operator station client is logged into a first operator station server and changes the parameters of a closed-loop controller that is located in the process image of a second operator station server, both the first and also the second operator station server must be included in the restriction.

Preferably, the operator station server is configured to be notified about the end of the specific period of time by the operator of the technical plant during operation and monitoring of the technical plant.

It is a further object, moreover, to provide a method for operating a technical plant with a control system, in particular a process or production plant, which has an operator station server and an engineering station server, where the engineering station server comprises a computer-implemented design tool via which an automation configuration for an automation of the technical plant can be created, and where the engineering station server is configured to transmit the automation configuration for an operation and monitoring of the technical plant to the operator station server, and w where the operator station server, if an abort condition is present, refuses a receipt or a processing of the automation configuration for the operation and monitoring of the technical plant for a specific period of time.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The characteristics, features and advantages of this invention described above and also the manner in which these are achieved will be explained in a clearer and easier to understand way in conjunction with the description given below of an exemplary embodiment, which is explained in greater detail in conjunction with the drawings, in which.

DETAILED DESCRIPTION OF THE RELATED ART

Figure 1:
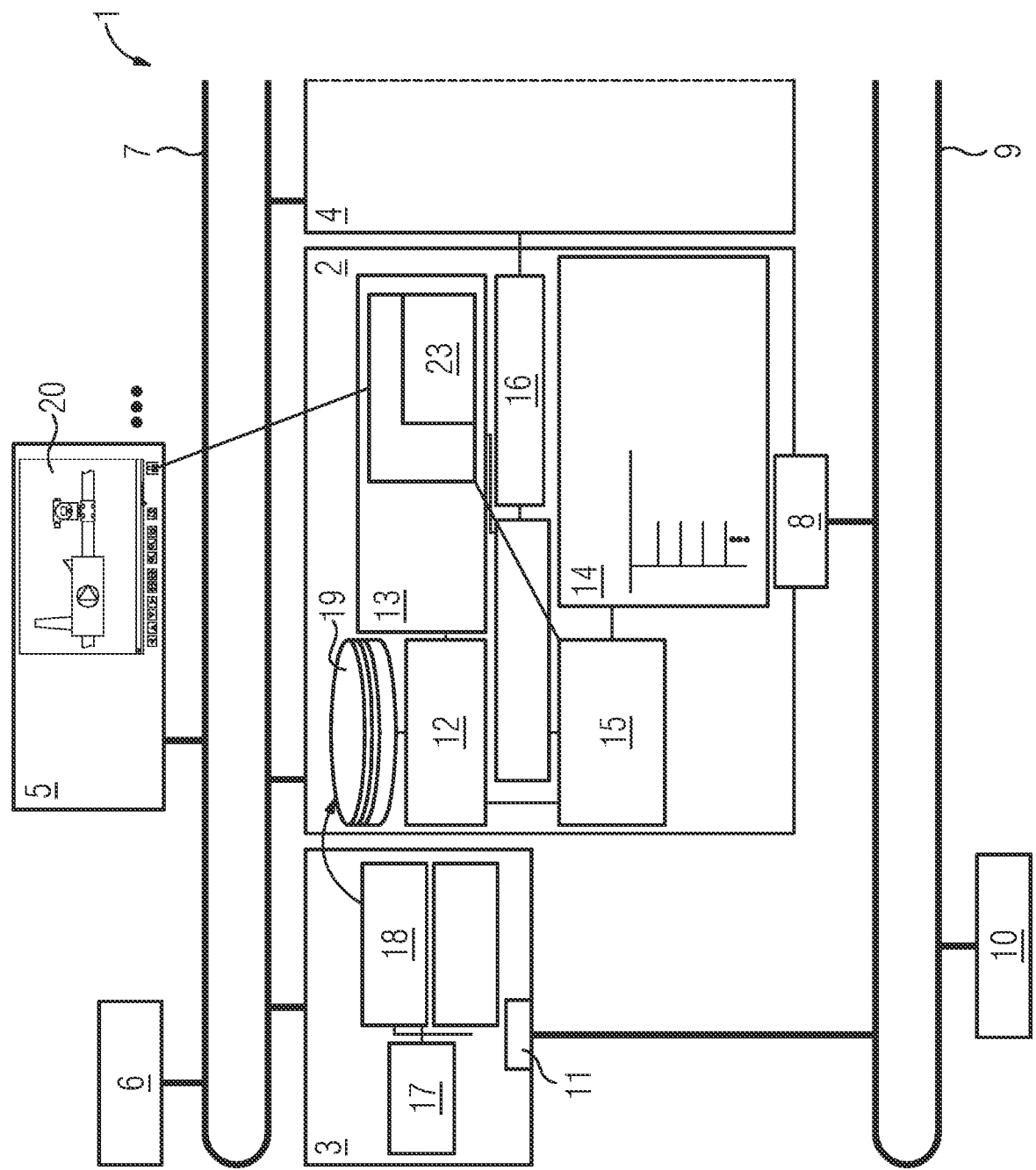
FIG. 1 shows a schematic diagram of a control system in accordance with the invention.

Shown in FIG. 1 is a part of an inventive control system 1 of a technical plant embodied as a process plant, i.e., as a process engineering plant. The control system 1 comprises a first operator station server 2 and an engineering station server 3. Moreover, the control system 1 comprises a second operator station server 4, an operator station client 5 and an engineering station client 6.

The first operator station server 2, the engineering station server 3, the second operator station server 4, the operator station client 5 and the engineering station client 6 are linked to each other via a terminal bus 7 and optionally to the further components of the control system 1 such as a process data archive (not shown in the figure).

For the purposes of control and monitoring, a user or operator can access the first operator station server 2 or the second operator station server 4 via the operator station client 5 over the terminal bus 7. A project planner, in the course of engineering or project planning of an automation of the process plant, can access the engineering station server 3 via the engineering station client 6 over the terminal bus 7. The terminal bus 7, without being restricted thereto, can be formed as an Industrial Ethernet, for example.

The first operator station server 2 has a device interface 8, which is linked to a plant bus 9. With this device interface 8, the first operator station server 2 can communicate with an automation device 10 and also with further components of the process plant optionally present. The plant bus 9, without being restricted thereto, can be formed as an Industrial Ethernet, for example. The automation device 10 can be linked to any given number of subsystems (not shown). The engineering station server 3 likewise has a device interface 11 to the plant bus 9 and to the components linked thereto, such as the automation device 10.

Implemented on the first operator station server 2 are a data management service 12, a visualization service 13 and a process image 14. Also implemented on the first operator station server 2 are a load restriction service 15 and a distribution service 16. Implemented on the engineering station server 3 are a design tool 17 and a compilation service 18.

Described below is the execution sequence of an inventive method: The project planner, with the aid of the computer-implemented design tool, implements an automation configuration 19 for an automation of the process plant at the engineering station server 3. The automation configuration 19 serves above all in this case to enable measurements to be automated with the individual process components and also enables the process components to be controlled and regulated. A communication between the individual process components can also be determined by the automation configuration. The automation configuration 19 is placed by the compilation service 18 of the engineering station server 3 into formats that the first operator station server 2 or the automation device 10 can process.

The automation configuration 19 is subsequently transmitted from the engineering station server 3 to the first operator station server 2. The transmission to the automation device 10 will not be further discussed below. The load management service 12 checks in this case whether the automation configuration 19 is to be received by the first operator station server 2 or whether the receipt is to be refused for a specific period of time. As an alternative, the load management service 12 can also initially allow a transmission of the automation configuration 19 to the first operator station server 2 but prevent a processing of the automation configuration 19 for a specific period of time. The automation configuration 19, although thus physically located on the operator station server 2, is not put into use and is thus without effect.

The prevention of the receipt or processing of the automation configuration 19 is undertaken by the load management service 12 on the instruction of the load restriction service 15. This triggers the load management service 12 when an abort condition is present. The presence of the abort condition can be established automatically by the first operator station server 2 itself. To this end, it can check, for example whether, through the acceptance and/or the processing of the automation configuration, a potential overload situation would be produced for the first operator station server 2.

The abort condition can, however, also be predetermined by the operator. To this end, the operator can make a corresponding request to the load restriction service 15 of the first operator station server 2 through the operator station client 5. In this case, the operator can predetermine, for example, that for the period of 30 minutes no (new/updated) automation configuration 19 is to be processed by the first operator station server 2, in order not to interrupt the operator, for example, while they are performing a critical task.

The end of the period of time cannot only be predetermined by the operator. Instead, the first operator station server 2 can establish the end of the period of time itself, i.e., automatically by, for example, creating forecasts with regard to the load on its resources or by having them created and taking these into account in determining the end of the period of time. The load restriction service 15 can access the diagnostic messages of central processing units (CPU) of the operator station server 2 that are stored in the process image 14. The reason for an abort condition can also lie in the fact that a high number of process alarms are present in the process image 14 (i.e., are active) and therefore a processing or a receipt of the automation configuration is not sensible at present.

When the load management service 12 is to interrupt the receive process or the processing process for the specific period of time, the load restriction service 15 creates an alarm message in parallel thereto, which is stored in the process image 14 of the first operator station server 2. The project planner and the operator have access to this alarm message (in the form of a message sequence display on the operator station client 5).

Figure 2:
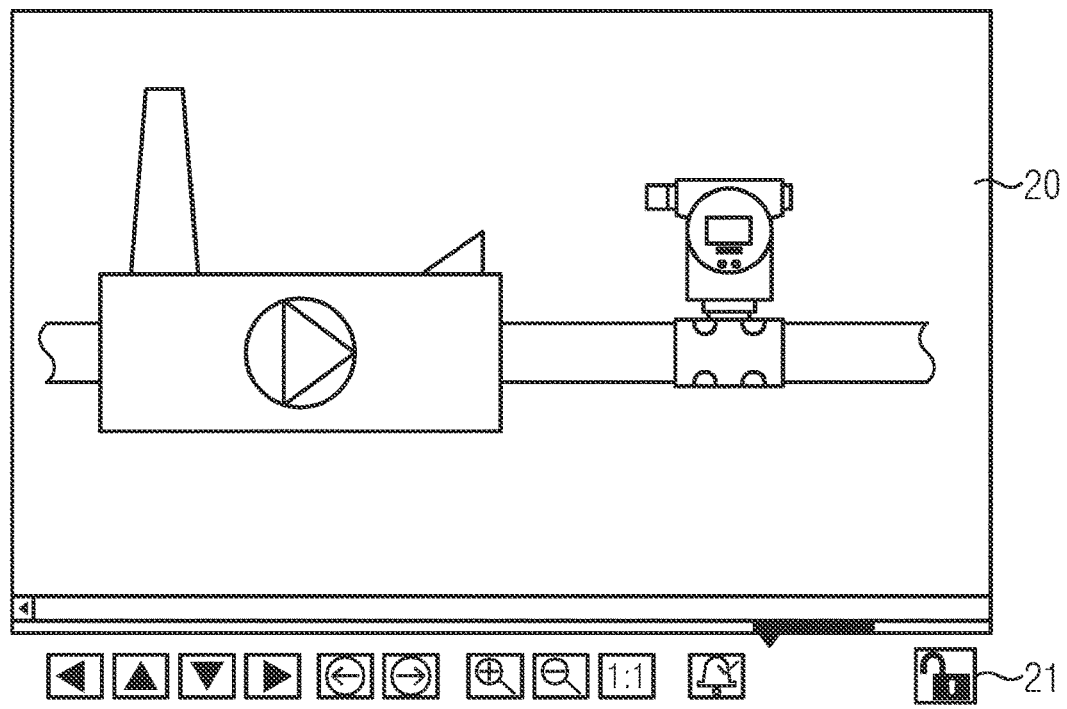
FIG. 2 shows a plant mimic diagram for operation and monitoring in accordance with an embodiment of the invention.
Figure 3:
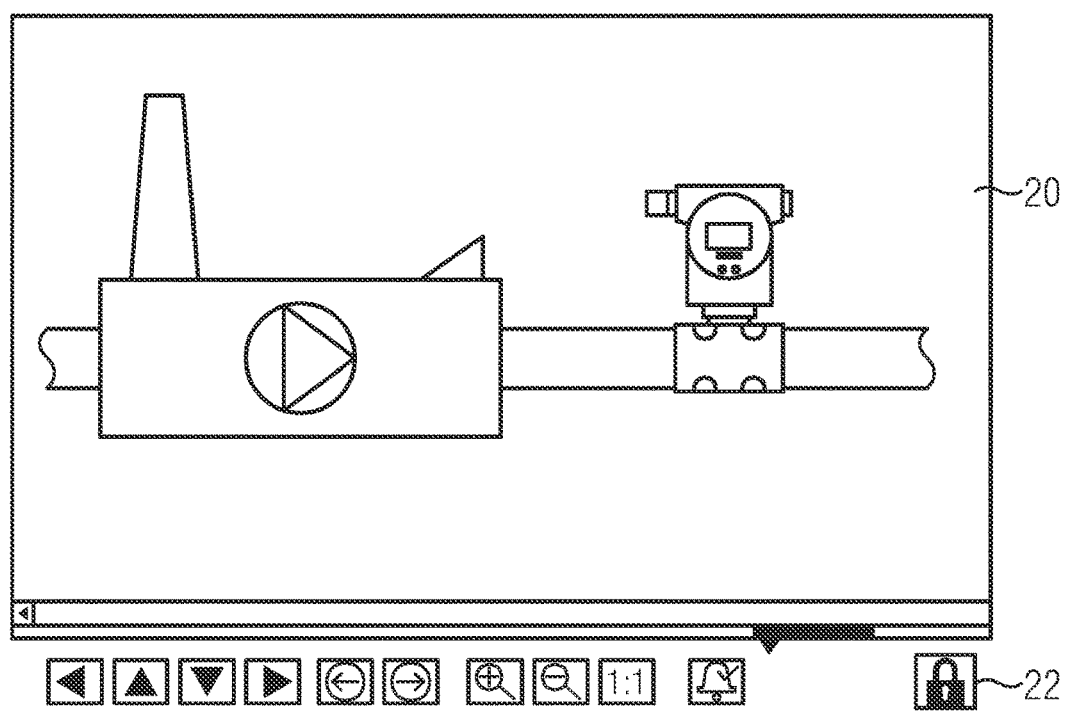
FIG. 3 shows the plant mimic diagram of FIG. 2 in accordance with an alternative embodiment of the invention.
Figure 4:
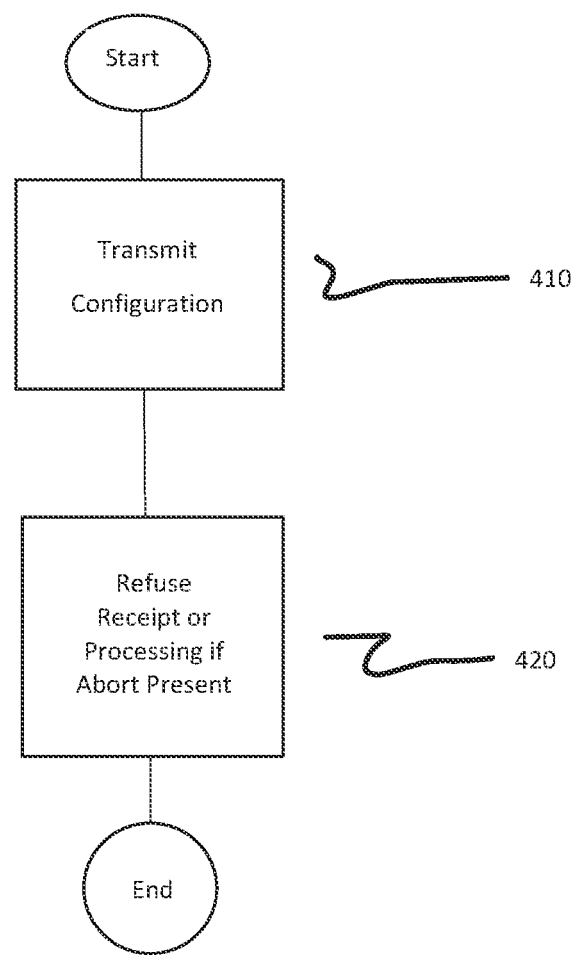
FIG. 4 is a flowchart of the method in accordance with the invention.

Shown in FIG. 2 is plant mimic diagram 20, which is displayed to the operator via the operator station client 5. In the right-hand lower area of the plant mimic diagram 20 it is displayed to the operator, in the form of an unlocked padlock symbol 21, that there is currently no restriction taking place on the receipt or processing of a new or updated automation configuration 19. FIG. 3 shows a locked padlock symbol 22 for the opposite case, i.e., a restriction is occurring.

An operator station client 5 can be logged into different operator station servers 2, 4 and through the distribution all process objects can still be accessible for operation and control. As a result, a restriction localization service 23 is moreover implemented on the first operator station server 2. This establishes which operator station servers 2, 4 are affected by the restriction of the receipt/processing. If, for example, the operator is logged in with the operator station client 5 at the first operator station server 2 and changes the parameters of a closed-loop controller, which is located in a process image (not shown) of the second operator station server 4, then both the first operator station server 2 and also the second operator station server 4 must be included in the restriction. The restriction localization service 23 transfers this information to the load restriction service 15. This now causes the data management service 12 of the first operator station server 2 and a data management service of the second operator station server 4 (not shown) to perform the requested restriction, until this is revoked, such that, for example, the operator can bring a critical task to an end.

Overall, a contribution to a higher availability of the technical plant can be made by the disclosed embodiments of the invention, specifically when a web-based control system 1 is used.

FIG. 3 is a flowchart of the method for operating a technical plant with a control system 1 including an operator station server 2, 4 and an engineering station server 3 comprising a computer implemented design tool 17 via which an automation configuration 19 for an automation of the technical plant is creatable.

The method comprises transmitting, by the engineering station server 3, the automation configuration 9 to the operator station server 2, 4 for operating and monitoring the technical plant, as indicated in step 410.

Next, the operator station server 2, 4 refuses to receive or process the automation configuration 19 for the operation and monitoring of the technical plant, for a specific period of time, if an abort condition is present, as indicated in step 420.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for a technical plant, comprising:
an operator station server operatively coupled to first and second buses, said operator station server acquiring data of an operating and monitoring system and acquiring alarm and measured value archives of the control system of the technical plant; and
an engineering station server operatively coupled to the first and second buses, the engineering station server comprising a computer-implemented design tool via which an automation configuration for an automation of the technical plant is creatable, and the operator station server and the engineering server being linked to each other via at least the first bus;
wherein the engineering station server is configured to transmit the automation configuration for operating and monitoring of the technical plant to the operator station server;
wherein the operator station server is configured to refuse a receipt or processing of the automation configuration for the operation and monitoring of the technical plant for a specific period of time if an abort condition is present; and
wherein the operator station server is further configured to establish a presence of the abort condition automatically by one of (i) recognition of a possible overloading of the operator station server, (ii) receipt of the automation configuration from the engineering station server and (iii) processing of the automation configuration by the operator station server.

2. The control system as claimed in claim 1, wherein the operator station server is further configured to inform the engineering station server about the refusal of the receipt or the processing of the automation configuration.

3. The control system as claimed in claim 2, wherein the operator station server is further configured to inform an operator of the technical plant about the refusal of the receipt or the processing of the automation configuration.

4. The control system as claimed in claim 1, wherein the operator station server is further configured to inform an operator of the technical plant about the refusal of the receipt or the processing of the automation configuration.

5. The control system as claimed in claim 1, wherein the operator station server is further configured to create an alarm message including information about the refusal of the receipt or the processing of the automation configuration by the operator station server.

6. The control system as claimed in claim 5, wherein the operator station server is further configured to provide an operator of the technical plant with the alarm message in a message sequence display via an operator station client configured to provide the alarm message.

7. The control system as claimed in claim 1, wherein the operator station server is further configured to establish an end of the specific period of time automatically by one of (i) removal of a possible overloading of the operator station server, (ii) receipt of the automation configuration from the engineering station server and (iii) processing of the automation configuration.

8. The control system as claimed in claim 1, wherein the operator station server is further configured to obtain a notification of presence of an abort condition from an operator of the technical plant during operation and monitoring of the technical plant.

9. The control system as claimed in claim 8, wherein the operator station server is further configured to obtain a notification of an end of the specific period of time from the operator of the technical plant during operation and monitoring of the technical plant.

10. The control system as claimed in claim 1, wherein the technical plant comprises a process or production plant.

11. A method for operating a technical plant with a control system including an operator station server operatively coupled to first and second buses and including an engineering station server operatively coupled to the first and second buses, the engineering station server comprising a computer-implemented design tool via which an automation configuration for an automation of the technical plant is creatable, the method comprising:
transmitting, by the engineering station server, the automation configuration to the operator station server for operating and monitoring the technical plant; and
refusing, by the operator station server for a specific period of time receipt or processing of the automation configuration for the operation and monitoring of the technical plant if an abort condition is present;
wherein the operator station server and the engineering server are linked to each other via at least the first bus, said operator station server acquiring data of an operating and monitoring system and acquiring alarm and measured value archives of the control system of the technical plant; and
wherein the operator station server is configured to establish a presence of the abort condition automatically by one of (i) recognition of a possible overloading of the operator station server, (ii) receipt of the automation configuration from the engineering station server and (iii) processing of the automation configuration by the operator station server.

12. The method as claimed in claim 11, wherein the technical plant comprises a process or production plant.

* * * * *